Nov. 2, 1948.                R. K. HANSEN                 2,452,652
                    GLASS SEALING METHODS AND MACHINES
Filed Aug. 1, 1944                                      2 Sheets-Sheet 1
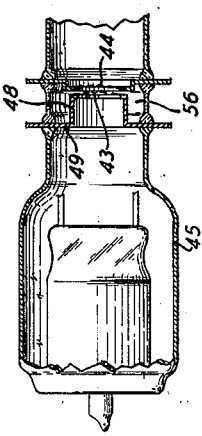
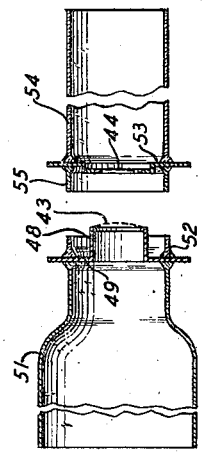
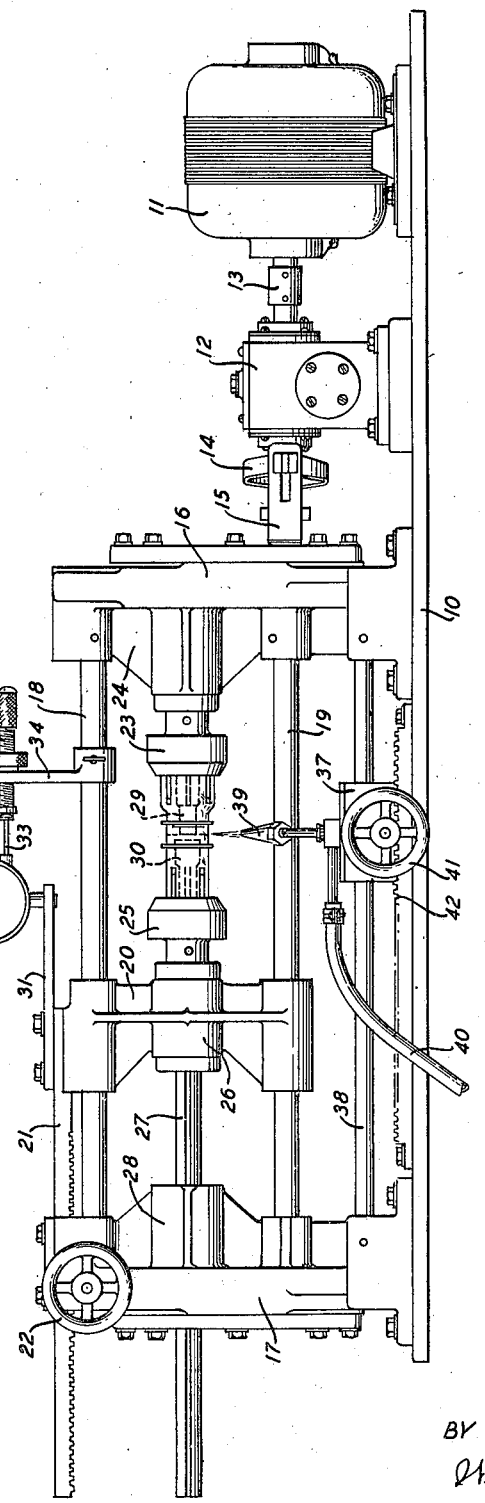
INVENTOR
R. K. HANSEN
BY
*Walter C. Kiesel*
ATTORNEY

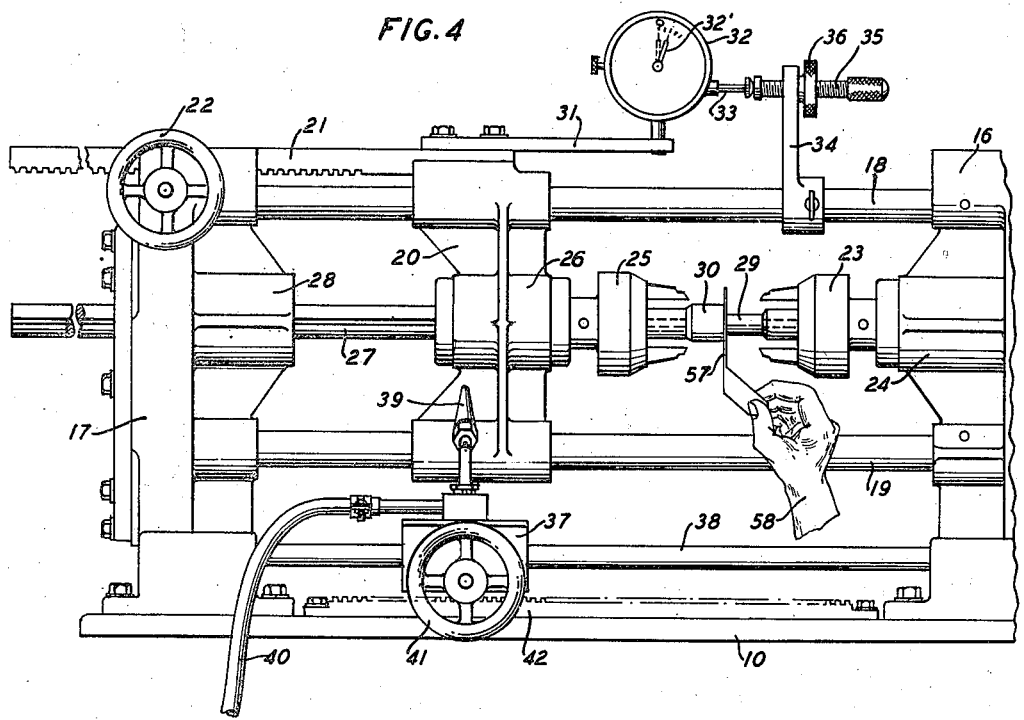
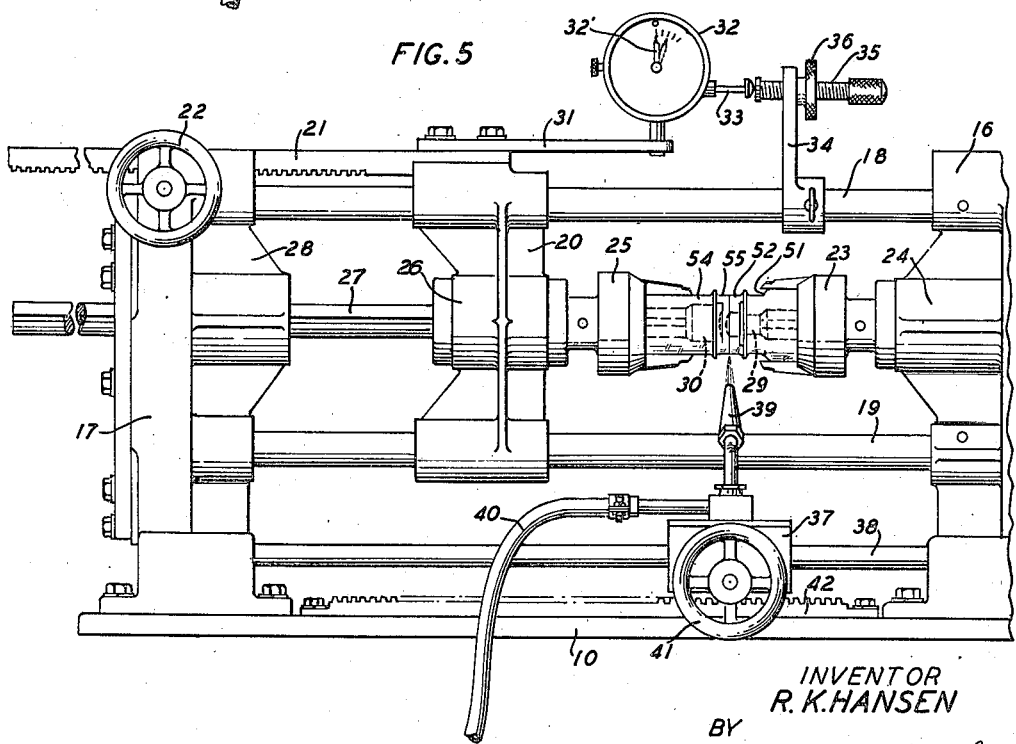

Patented Nov. 2, 1948

2,452,652

UNITED STATES PATENT OFFICE 2,452,652

GLASS SEALING METHOD AND MACHINE

Rolf K. Hansen, Bloomingdale, N. J., assignor to Bell Telephone Laboratories, Incorporated, New York, N. Y., a corporation of New York Application August 1, 1944, Serial No. 547,638

7 Claims. (Cl. 49—1)

This invention relates to glass sealing methods and machines therefor utilized in the splicing of sections of glass envelopes containing metallic members requiring exact spacing, as for example, in ultra-high frequency electron discharge devices.

The invention is of particular advantage in the fabrication of electron discharge devices intended for ultra-high frequency radiation of energy, and operating on the resonant cavity principle in which the electrons from a suitable source in the device are influenced by potentials applied to spaced permeable electrodes in a chamber or cavity in which the spacing and alignment of the controlling electrodes in the cavity are extremely important for determining the resonance frequency at which the device operates. In a specific embodiment of such a device, the controlling electrodes may be fine mesh disc grid electrodes of convex configuration mounted on metallic ring members which are sealed radially in the cylindrical wall of the enclosing vessel of the device.

Heretofore, the manufacturing processes of fabricating ultra-high frequency devices of this type have been extremely difficult, particularly with respect to the accurate spacing of control electrodes. In view of the delicate nature of the mesh grid structures and the infinitesimal openings therein it is impossible to introduce a suitable solid gauge through or between these electrodes during the sealing process since the gauge cannot be removed after the seal is completed or the gauge would ruin the electrodes. On the other hand, any reducible substance, intended to function as a temporary gauge, would be undesirable either from the standpoint of being unstable under the influence of the heating flame employed in the sealing operation or would tend to cause deterioration of the fine apertures of the mesh electrodes by clogging. Such substances may also oxidize or react unfavorably with the fine mesh metal or the cathode coating and thereby render the device unsuitable for use.

Accordingly, this delicate sealing operation has in the past been performed by highly skilled glass workers who relied on attaining the desired spacing, which for a specific example, may be .035 inch ±.002 inch, by visual means but the results were far from satisfactory since a large shrinkage occurred due to the spacing being beyond the tolerable limits acceptable for the intended operation. Furthermore reproducibility was difficult to attain so that infinitesimal variations in dimensions of the cavity resulted in unstable operation when changing devices in the working circuit or numerous adjustments had to be made to compensate for these irregularities. Such personalized fabrication materially reduces manufacturing production and creates great waste and the variability of the characteristics of the devices causes inconstancy and inefficiency in the operation of the companion circuit elements of the power generating systems for which the devices are intended.

The main objects of this invention are to overcome these difficulties and insure reproducible characteristics in such devices on a quantity production basis in which shrinkage loss is entirely eliminated.

In accordance with this invention these objects are attained by a method of sealing involving the use of a sealing lathe having a pair of opposed chucks with coaxial spindles for supporting prepared glass sections of the device including the assembled grid electrodes, one of the chucks being reciprocally movable, and an indicator carried by the movable chuck to register the required space relation between the surfaces of the grid electrodes during the sealing operation. The indicator may be provided with a movable arm which engages a stop member mounted on the lathe in relation to the other supporting chuck.

The method of sealing involves the manipulation of the movable chuck towards the other chuck so that the central spindles are in approaching relation whereupon a feeler gauge of definite thickness is inserted between the anvils of the spindles and the spindles are brought into abutting relation on opposite sides of the gauge to register a corresponding measurement on the indicator. The measurement is noted and the chucks are separated to insert the glass sections of the device in opposed relation with the grids seated against the anvils of the spindles in the chucks. The reciprocable chuck is then advanced to bring the end glass collars on the glass sections together in splicing relation.

The unsealed joint is rotated and heated to render the contacting edges of the glass plastic to effect fusion of the glass collars at the joint. While the joint is in a plastic state the reciprocable chuck is advanced to register the previously noted measurement on the indicator to insure an identical space relation between the anvils within the sealed cavity after which the glass is allowed to cool and the assembly removed from the chucks.

The feature of this construction and method is that the spacing of the internal grids in the assembly is accomplished by an external gauge and no extraneous body or substance is interposed between the grid surfaces in the cavity The operation is expeditious, efficient and accurate with practically no shrinkage loss due to inaccurate spacing of the grids. Furthermore, the procedure may be performed by an inexperienced operator so that large production may be attained without sacrificing quality.

The invention is described with more particularity in the following detailed description and is shown in the accompanying drawings.

Fig. 1 is a view in cross-section of a partial assembly of a discharge device and illustrates the critical close spacing of the fine mesh grids forming the end walls of the resonance cavity of the device.

Fig. 2 is another view in cross-section of the separate grid electrodes sealed into glass sections forming a part of the enclosing vessel of the device and showing the sections prior to the splice sealing operation to join the sections together.

Fig. 3 is a view in elevation of the complete assembly of the sealing lathe employed according to this invention and shows the sections of the device in position for sealing and the indicator mounted on the lathe to control the spacing of the grids during the sealing operation.

Fig. 4 shows a slightly enlarged elevation view of the lathe for performing the preliminary step of the sealing method in which an accurate hand gauge is held between the spindles to register a definite measurement on the dial indicator; and Fig. 5 is another view of the lathe showing the sealing of the glass sections of Fig. 2 to splice the cavity and accurately space the grid electrodes therein.

The sealing mechanism for performing the splicing of the glass sections, as shown in Fig. 2 in accordance with this invention, is mounted on a base or bench 10 and employs a motive source of power, such as a motor 11, connected to a reduction gear housing 12 by a short shaft 13. The power is controlled by a clutch 14 to the left of the reduction gear housing which is coupled to a shaft 15 cooperating with a train of gears, not shown, enclosed in an upright journal frame 16. A similar journal frame 17 is mounted at the opposite end of the bench and these frames are connected by a pair of parallel horizontal rails 18 and 19 which support a sliding carriage 20 mounted between the frames. The carriage is reciprocally movable through a geared rack 21 attached to the top of the carriage and the rack cooperates with a pinion gear controlled by a handwheel 22 in the upper left-hand corner of the lathe assembly. A glass supporting chuck 23 is mounted in a journal 24 of the frame 16 and is rotatably driven at a reduced speed by the gear train in the frame. A similar opposed glass supporting chuck 25 is mounted in the journal 26 of the carriage 20 and is connected to a splined shaft 27 extending through the journal 28 on the end frame 17. The driven chuck 23 supports a coaxial spindle 29 of small diameter and the reciprocable chuck 25 supports an opposing coaxial spindle 30 the opposing ends of the spindles forming anvils for seating the concave and convex surfaces of the grid electrodes of the sections of the glass vessel to be spliced.

The rack 21 carries an arm 31 extending parallel and in the same direction as the chuck 25 and carries a micrometer dial gauge or indicator 32 on the end thereof in vertical aligned relation with the reciprocal chuck 25 the gauge being provided with an outwardly extending slidable arm or plunger 33 which actuates the pointer 32' on the dial. An upright arm 34 is fixedly attached to the rail 18 in relation to the chuck 23 and is provided with an adjustable stop screw or pin 35 held in fixed position by a lock nut 36. The lathe is also provided with a slidable platform 37 which rides on rail 38 extending along the bottom of the lathe between the frames and the platform supports an upwardly inclined burner nozzle 39 which is connected to a supply hose 40 conducting hydrogen at low pressure to the nozzle for producing an annealing flame directed toward the glass parts in the chucks. The same hose connection may be supplied with a mixture of gas and air at high pressure to produce a point flame of high intensity for rendering the glass plastic during the sealing operation. The burner platform is movable on the rail 38 through the cooperating action of a pinion gear controlled by hand wheel 41 and the geared rack 42 mounted on the bench.

The sealing or splicing mechanism, as hereinabove described, is primarily intended to accurately splice separate glass sections including electrode assemblies for producing a predetermined close space relation between the electrodes in the fabrication of an ultra-high frequency discharge device, a portion of which is shown in Fig. 1. This device includes an intermediate cavity or chamber in which a pair of fine wire mesh grid surfaces 43 and 44 are accurately spaced in axial relation and sealed into a container 45. The fine wire mesh electrode 43 as shown more clearly in Fig. 2, has a slightly convex configuration and is mounted on the rim of a cylindrical portion 48 of an electrode structure also provided with an annular disc portion 49. The electrode structure is usually formed of copper to provide a good hermetic seal to the glass of the enclosing vessel and to facilitate assembly a cylindrical section 51 of large diameter has a tapered section sealed to one surface of the annular disc portion 49 and a short collar or sleeve section 52 sealed to the opposite surface of the portion coincident with the seal of the section 51 the sleeve being shorter than the height of the cylindrical section 48 of the electrode. The other mesh surface 44 has a concave configuration with respect to the surface 43 and is supported on a substantially flat copper ring 53 having a glass section 54 sealed to one side of the ring and a short collar or sleeve 55 sealed to the opposite surface thereof, the collars 52, 55 and the section 54 being of the same diameter glass tubing and the electrode structures 48 and 53 being concentrically sealed in the sections to insure axial symmetry between the center of the electrodes and the periphery of the collars 52 and 55, respectively.

Since the resonant frequency of the cavity 56 in the device of Fig. 1 is dependent in part upon the space relation between the mesh grid electrodes 43 and 44, this spacing, to take a typical example, may be .035 inch ±.002 inch for a given resonance frequency, must be accurately maintained during the sealing operation, in order that the device will operate efficiently in the power generating system for which it is adaptable. In view of the small spaced relation between the mesh grids in the cavity it is almost impossible to attain accurate spaced relation between these electrodes during the sealing of the collars by visual means. On the other hand, it is not possible to insert a gauge between the mesh grid surfaces during sealing since the gauge would obstruct the passage through the grids and could not be removed after the vessel is sealed. Furthermore, a reducible spacer member could not be inserted in the assembly and vaporized or destroyer after assembly since the residual substance would oxidize or deleteriously affect the clean electrode surfaces contained within the cavity and the cathode surface of the device. In the same manner an annular insulating spacer member could not be used across the short gap due to the ultra-high frequencies employed in the operation of the device and the presence of the small leakage path across the end of the insulator between the electrodes. All of these difficulties are overcome in accordance with this invention by an external method of gauging the short gap between the mesh electrodes and insuring positive and reproducible accurate attainment of the required spacing whereby there is practically no shrinkage loss in the splicing of the glass sections of the vessel to construct the resonance cavity of the device.

This is accomplished by a series of steps involving a method of splicing as hereinafter described involving the use of the sealing lathe as shown in Figs. 4 and 5. Prior to the splicing of the glass sections of the device as shown in Fig. 2, the machine, as shown in Fig. 4, is set up to calibrate the dial indicator 32 to register zero when the spindles 29 and 30 in the chucks are in abutting relation. This is accomplished by the setting of the stop arm 34 and the screw 35 in relation to the arm 33 of the dial. The first operation after this preliminary adjustment is to withdraw the chuck 25 mounted on the carriage 20 by the operation of handwheel 22 and place an accurately machined feeler gauge 57 against the spindle 29 as represented by the hand 58 of the operator and advance the spindle 30 against the opposite side of the gauge to record the thickness of the gauge on the dial as indicated by the pointer 32'. If the space relation desired in the gap of the cavity is .035 inch and the thickness of each grid is .012 inch the gauge 57 is accurately machined to a thickness of .059 inch. The reading on the dial indicator will then be the same as the thickness of the gauge and this reading is noted by the operator for future reference. If desired or more convenient, the dial may be adjusted to zero with the hand gauge between the spindles and the zero reading utilized later during the splicing operation. The chuck 25 is backed away from the spindle 29 in the oppositely disposed chuck and the machine is ready to receive the glass assembly sections of the device, as shown in Fig. 2.

The jaws of chuck 23 are opened to receive the glass section 51 and the central spindle 29 fits into the cylindrical portion 48 of the electrode and the convex grid surface 43 is seated on the similarly curved surface of the anvil on the end of the spindle with the short collar 52 extending towards the oppositely disposed chuck whereupon the jaws of the chuck are secured to hold this section in place. In a similar manner the other section 54 is mounted in the jaws of the chuck 25 and slides over the larger diameter spindle 30 to seat the concave mesh grid 44 in a similarly shaped depression in the anvil of the spindle with the collar 55 extending towards the chuck 23. The jaws of the chuck are secured and the carriage 20 advanced by operation of the handwheel 22 to bring the opposing collars in abutting relation to check the concentric alignment thereof at the splicing joint. The reading on the dial indicator 32 will usually be less than the required spacing obtained with the gauge due to the variability in the height of the collars 52 and 55 with respect to the surfaces of the grid electrodes 43 and 44.

The mechanism is now set up to perform the splicing operation and this is started by throwing the clutch 14 to apply power to the train of gears to rotate or drive the chuck 23 which in turn imparts similar rotative action to chuck 25 through the interconnecting glass sections 51 and 54, respectively. The burner 29 is then advanced on the rail 38 to direct the nozzle toward the splice formed by the abutting ends of the collars 52 and 55, respectively, and a low pressure flame is directed toward the rotating collars to raise the temperature of the glass to avoid creating strains in the seals of the disc electrodes. When a suitable temperature is attained the flame is changed to a high pressure gas and air mixture of intense heating power such as a point flame which strikes the splice and renders the glass plastic in the vicinity of the splice. The operator now manipulates the handwheel 22 while the glass is in a plastic state to force the carriage 20 and chuck 25 toward the opposing chuck until the indicator 32 registers the previously noted measurement of .059 inch on the gradations of the dial or the dial may be adjusted to zero, if that method is preferred. This position is held and the splice completed by the sealing fire whereupon the air is cut off and a low pressure flame anneals the splice of the glass collar forming the cavity of the device. The burner is then displaced from its sealing position and the clutch thrown to stop the rotation of the chucks. After an interval of cooling the chuck 23 is opened by releasing the jaws and the carriage is retracted to remove the whole assembly in the chuck 25 thereby releasing the section 51 from the central spindle 29. The completed assembly is then removed from chuck 25 and the machine is ready for the next operation of gauging and setting up the sections in the chucks for the sealing operation.

This method and mechanism for splice sealing of the sections of the glass vessel insure accurate spaced relation between the grid surfaces in the cavity and materially increase production since the various operations may be performed by a relatively inexperienced operator and the shrinkage loss from inaccurate spacing is completely eliminated.

While the invention has been disclosed with respect to a specific type of device for attaining accurate space relation between internal electrodes in a sealed chamber it is, of course, understood that various changes may be made in the mechanism to adapt it for other devices so that the method and mechanism may be utilized in different aspects without departing from the scope of the invention as defined in the appended claims.

What is claimed is:

1. An external measuring device for determining the internal space relation between parallel metallic electrodes adapted to be sealed into an enclosing vessel formed of separate parts containing said electrodes individually, comprising opposed rotatable supporting means for the separate parts of said vessel, spindle means extending beyond said supporting means and adapted to abut against said parallel metallic electrodes, means for slidably moving one of said supporting means with respect to the other, an arm parallel to said slidable supporting means and movable therewith, an indicator carried by said arm, and a stop member opposite said indicator in relation to said other supporting means.

2. The combination of a glass sealing lathe having a driven chuck with a central projecting spindle, a pair of rails extending laterally on opposite sides of said chuck, a carriage reciprocally movable on said rails, an opposing chuck having a projecting spindle supported by said carriage with said spindles in coaxial relation, manually operable means for controlling the movement of said carriage and chuck supported thereby, an arm on said carriage projecting toward said driven chuck, an indicator mounted on said arm, a burner adjustably movable between said chucks, and a stop member on one of said rails adjacent said driven chuck and cooperating with said indicator.

3. An external measuring device for determining the internal space relation between transverse mesh electrodes mounted in cylindrical sections of an enclosing glass vessel, comprising a pair of opposed rotatable chucks for supporting said sections, cooperating spindles extending centrally from said chucks to form seating surfaces for said mesh electrodes, means for reciprocally moving one of said chucks with respect to the other chuck, an indicator gauge mounted on the reciprocally movable chuck, and a stop member opposite said gauge and mounted in relation to said other chuck.

4. An external measuring device for determining the internal space relation between transverse mesh electrodes mounted in cylindrical sections of an enclosing glass vessel, comprising a pair of opposed rotatable chucks for supporting said sections, cooperating spindles extending centrally from said chucks to form seating surfaces for said mesh electrodes, means for reciprocally moving one of said chucks with respect to the other chuck to bring the adjacent ends of said glass sections into aligned relation for splicing, an arm projecting from said reciprocally movable chuck toward said other chuck, a dial indicator having a horizontal plunger carried by said arm, and an adjustable stop member mounted adjacent said plunger and laterally positioned with respect to said other chuck.

5. The method of accurately gauging the space relation between internal electrode surfaces supported in separate sections of a vessel adapted to be splice-sealed between said surfaces in a glass sealing lathe having opposed rotatable chucks including projecting spindles and a gauge indicator carried by one of said chucks comprises, inserting a hand gauge between the spindles to record an identical measurement on said indicator, removing the hand gauge and securing said sections in the chucks with the electrodes seated on the ends of said spindles, advancing said sections together in abutting splice relation, said electrode surfaces being spaced apart within said sections, heating the splice to a plastic state, moving one of said chucks in an axial direction until the previously recorded measurement appears on said indicator, and fusing the splice while maintaining said indicator at the recorded measurement.

6. The method of accurately spacing internal transverse electrode surfaces in supporting sections of a vessel to be splice-sealed between said surfaces in a sealing lathe having opposed supporting chucks provided with central spindles and a gauge indicator affixed to one of said chucks which comprises, inserting a predetermined thickness gauge between said spindles, advancing the indicator supporting chuck into engagement with said gauge and other spindle to record the thickness of the gauge on said indicator, inserting the glass sections in the opposed chucks with the electrode surfaces lying in facing relation on the ends of said spindles, converging said sections into abutting relation to form a splice joint with the electrode surfaces enclosed in the sections in colateral relation, heating said joint to a fusing temperature to seal the sections together, manipulating one of the chucks while the seal is in a plastic state to adjust said indicator to the previously recorded indication, and completing the splice-sealing of the sections without varying the setting of said chucks and said indicator.

7. The method of externally measuring the internal space relation between colateral transverse electrodes mounted in separate glass sections of a vessel to be splice-sealed at an intermediate point between said electrodes in a sealing mechanism including a pair of opposed chucks with central projections, an external indicator gauge having a movable arm associated with one chuck and a stop member cooperating with said arm associated with the other chuck which comprises advancing the projections in the chucks into substantial meeting relation with a hand guage interposed therebetween and contacting said projections, simultaneously advancing said movable arm into engagement with said stop member to record the measurment on said external gauge, removing the hand gauge, inserting the glass sections in said chucks, seating said electrodes on said projections, moving one of said chucks toward the other chuck to bring said glass sections in abutting and splicing relation with said electrodes at a greater spacing distance than the final predetermined spacing, rotating said chucks, applying a heating flame to the splicing joint at the junction of said sections to render the glass plastic, compressing the plastic glass at the joint by movement of one chuck toward the other, simultaneously forcing said arm against said stop member to register the same measurement on said gauge as previously recorded, and holding the setting while the splice seal is completed.

ROLF K. HANSEN.

REFERENCES CITED

The following references are of record in the file of this patent:

UNITED STATES PATENTS

| Number | Name | Date |
| --- | --- | --- |
| 1,486,968 | Kempton | Mar. 18, 1924 |
| 2,271,658 | Miller | Feb. 3, 1942 |